Feb. 17, 1942.    H. R. DE SILVA    2,273,091
APPARATUS FOR ASCERTAINING A SUBJECT'S BEHAVIOR WHEN
OPERATING A MOTOR VEHICLE
Filed May 4, 1938    6 Sheets-Sheet 1

INVENTOR
Harry R. De Silva
BY
Watson, Bristol, Johnson & Leavenworth
ATTORNEYS

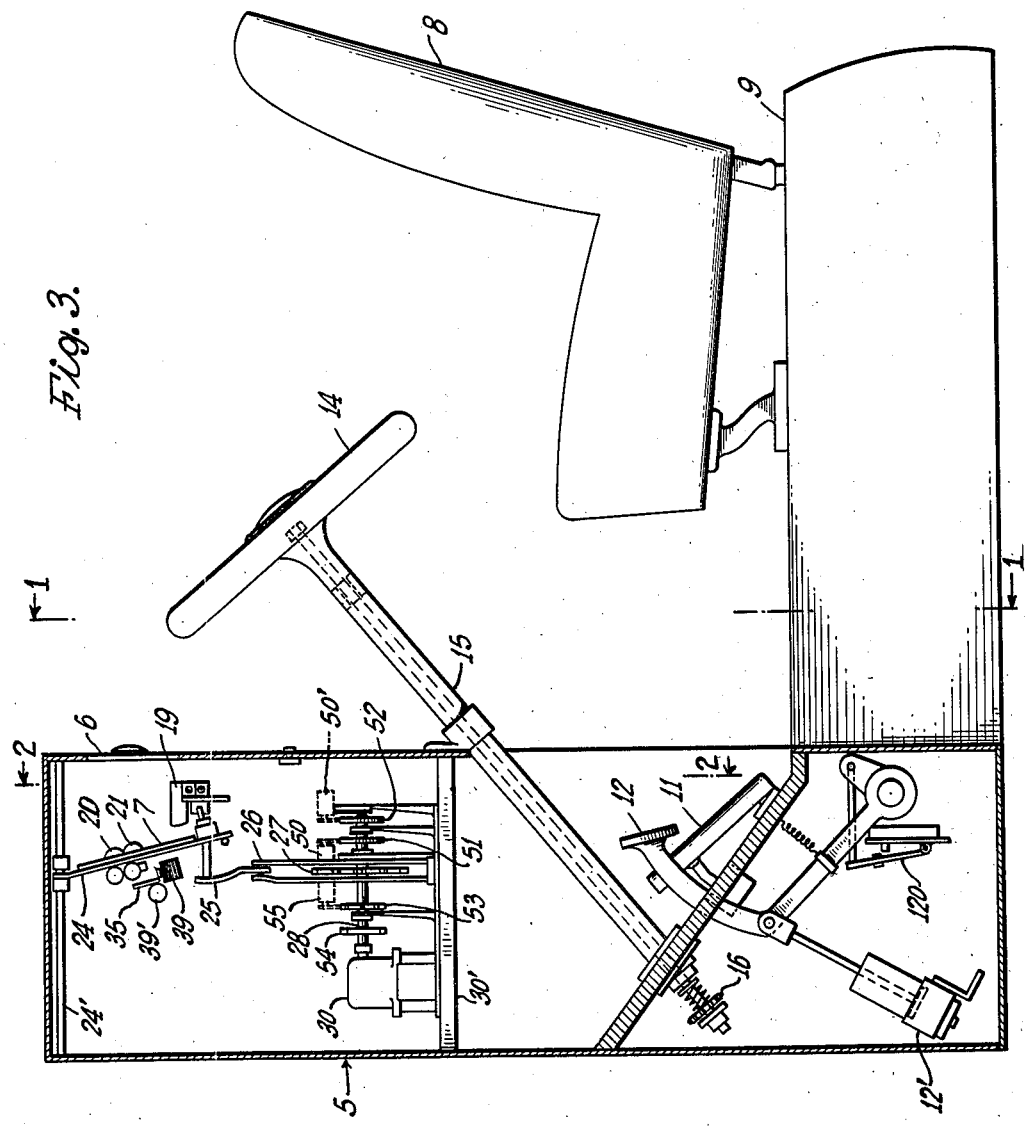

Feb. 17, 1942.   H. R. DE SILVA   2,273,091
APPARATUS FOR ASCERTAINING A SUBJECT'S BEHAVIOR WHEN
OPERATING A MOTOR VEHICLE
Filed May 4, 1938   6 Sheets-Sheet 3
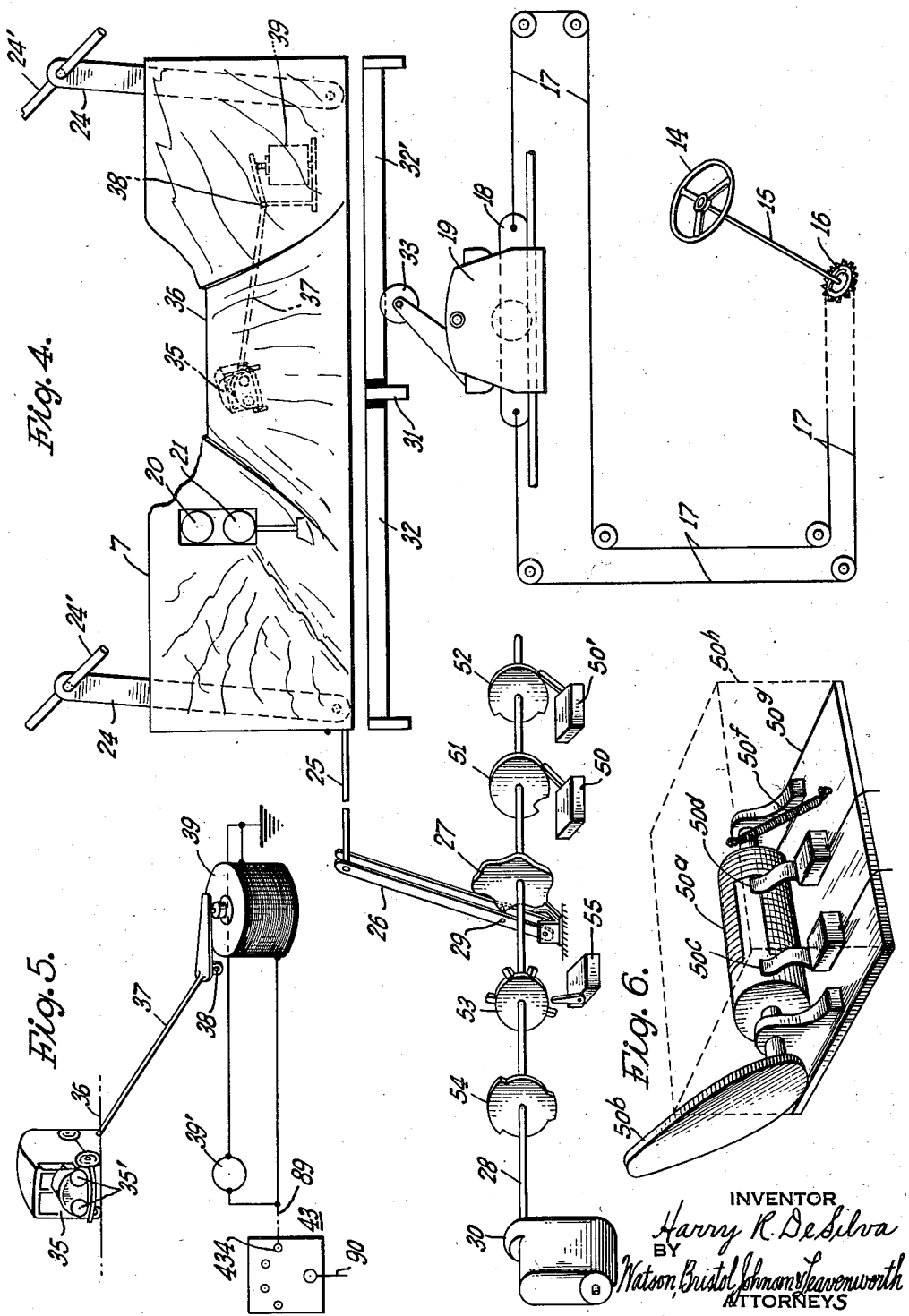
INVENTOR
Harry R. DeSilva
BY
Watson, Bristol, Johnson & Leavenworth
ATTORNEYS Feb. 17, 1942.  H. R. DE SILVA  2,273,091
APPARATUS FOR ASCERTAINING A SUBJECT'S BEHAVIOR WHEN
OPERATING A MOTOR VEHICLE
Filed May 4, 1938  6 Sheets-Sheet 5
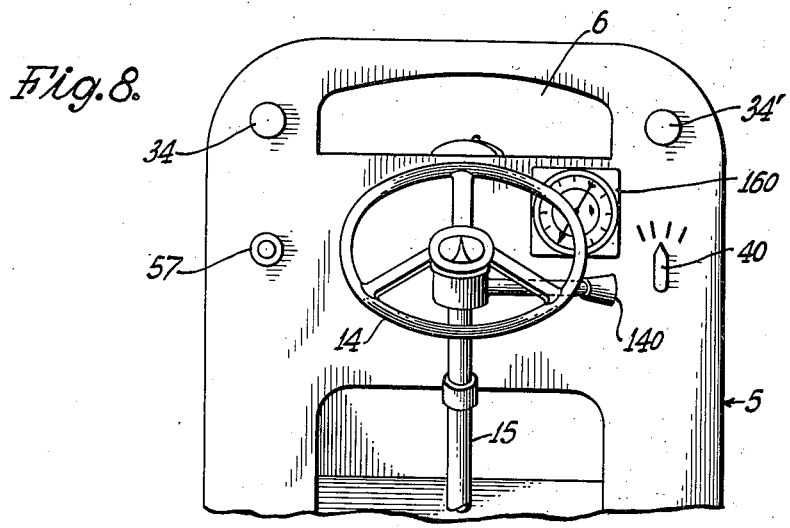
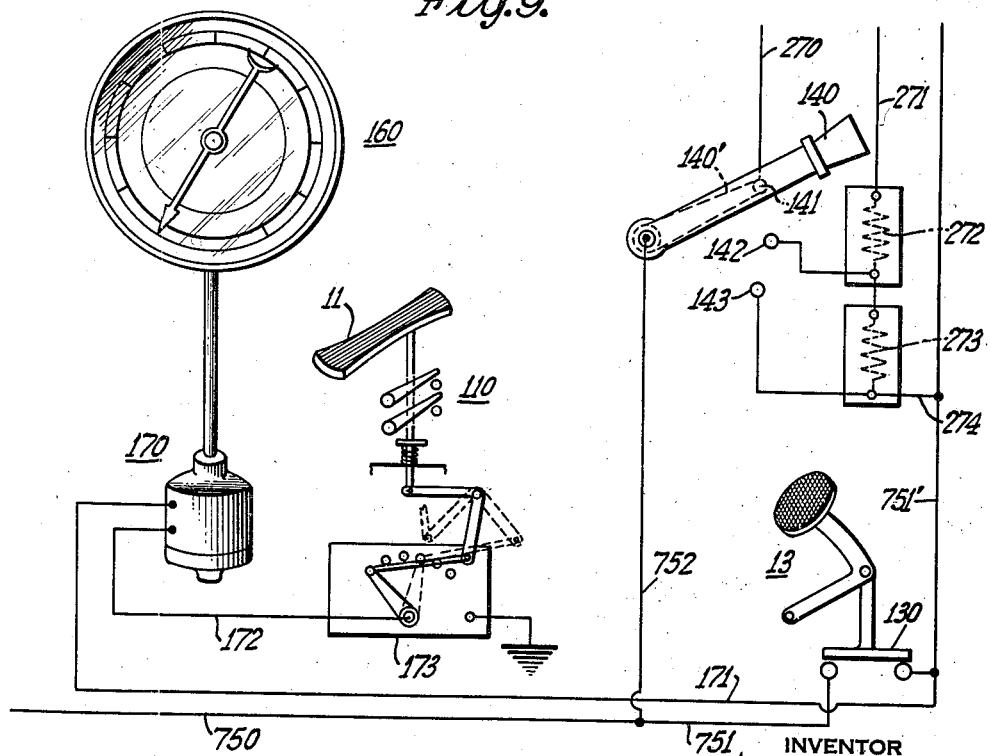
INVENTOR
Harry R. De Silva
BY
Watson, Bristol, Johnson & Leavenworth
ATTORNEYS Patented Feb. 17, 1942

2,273,091

UNITED STATES PATENT OFFICE 2,273,091

APPARATUS FOR ASCERTAINING A SUBJECT'S BEHAVIOR WHEN OPERATING A MOTOR VEHICLE

Harry R. De Silva, Cambridge, Mass.

Application May 4, 1938, Serial No. 206,092

15 Claims. (Cl. 35—11)

This invention relates to apparatus for ascertaining a subject's behavior as an operator of a motor vehicle when under actual driving conditions on a public highway.

More specifically, the invention relates to apparatus which is adapted for giving stimuli, simulating driving conditions that may be encountered by one operating a motor vehicle, together with registering means whereby a subject's behavior characteristics may be ascertained.

The invention has for its object generally the provision of apparatus with coordinated mechanisms for ascertaining with precision the behavior characteristics and sensitivities of a subject under driving conditions when operating a motor vehicle.

More specifically, the invention has for its object the provision of a combination of coordinated mechanisms for securing accurate data indicative of the behavior characteristics and sensitivities of a subject when operating a motor vehicle, and adapted for registering such characteristics and sensitivities in a recognized psychological manner.

Another object is to provide apparatus suitable for a clinic for ascertaining the behavior characteristics and sensitivities of a subject when operating a motor vehicle, by means of coordinated mechanisms of a character which registers such characteristics without the hazard of actually operating a motor vehicle on a public highway.

Another object is to provide apparatus that may be used for giving standard testing stimuli in a convenient manner, such apparatus being equipped with one or more motor vehicle controls and means for giving a sensory illusion of driving on a road, and is adapted for installation in a laboratory or testing room. Such apparatus is advantageously provided with ordinary car controls arranged to be manipulated by the subject while under test and includes devices for registering the behavior characteristics and sensitivities of the subject during the testing period.

Another object is to provide apparatus of the character indicated with an arrangement of suitable instrumentalities adapted to be installed in a testing cabinet which may have a driver's seat and standard controls, together with means, such as a transparency, for simulating actual driving conditions on a road, whereby a subject may be tested in a laboratory or other place of testing for the behavior characteristics desired.

Another object is to provide testing apparatus of the character indicated with means for simulating a plurality of road conditions requiring different reactions and responses by the operator or subject being tested, together with a plurality of response registering and indicating instruments selectively coordinated therewith.

Still another object is to provide a motor vehicle operator's testing apparatus with an electric network which incorporates a group of coordinated devices and instruments for giving stimuli and registering sensitivities and reactions and includes means for automatically changing the network to set up selectively various circuit arrangements coordinated respectively with suitable instruments for registering particular reactions of the subject being tested.

Other objects of the invention will in part be obvious and will in part appear hereinafter.

The invention accordingly comprises the features of construction, combination of elements and arrangement of parts, which will be exemplified in the construction hereinafter set forth and the scope of the invention will be indicated in the claims.

For a fuller understanding of the nature and objects of the invention, reference should be had to the following detailed description taken in connection with the accompanying drawings, in which:

Fig. 3 is a side view, partly in section and partly in elevation, of the cabinet shown in Fig. 1;

Fig. 4 is a fragmentary view showing details of certain mechanisms in the cabinet for effecting coordination of several of the instrumentalities in the apparatus of the present invention;

Fig. 5 is a view, partly in elevation and partly diagrammatic, showing a mechanism employed for moving an object momentarily onto the road scene in the cabinet of the present invention;

Fig. 6 is an elevational view showing details of certain switching devices employed in the present embodiment of the invention;

Fig. 8 is a fragmentary view of a modified form of cabinet that may be used in the practice of the invention;

Fig. 9 is a view, partly in elevation and partly diagrammatic, showing certain details of the apparatus shown in Fig. 8.

Figure 1:
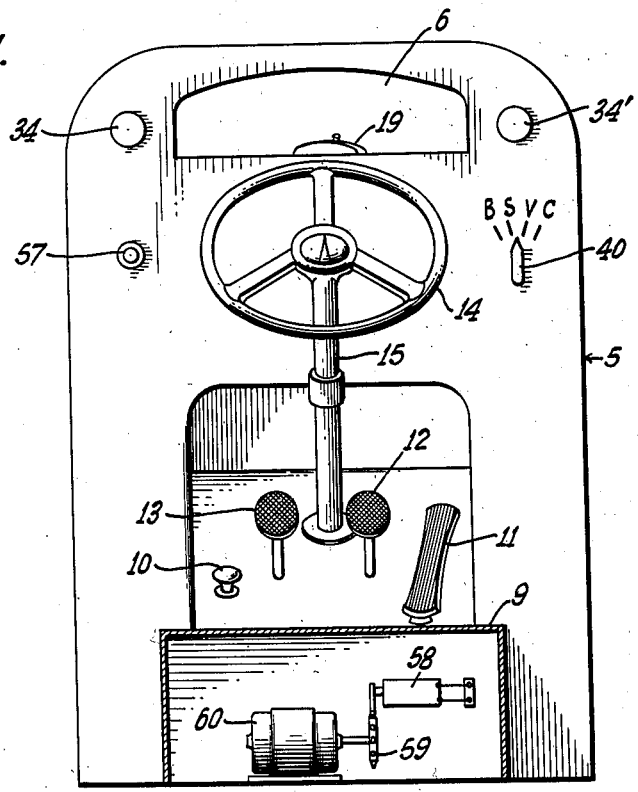
Fig. 1 is a view, mainly in elevation but having a lower portion in section, taken on line 1—1 of Fig. 3, showing apparatus provided in accordance with the invention, comprising a cabinet or panel equipped with standard motor vehicle controls.
Figure 2:
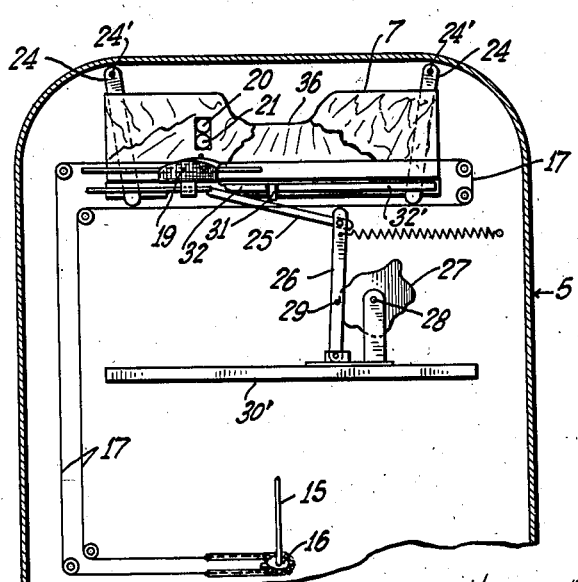
Fig. 2 is a fragmentary vertical sectional view showing details of the apparatus in Fig. 1 and taken on the line 2—2 of Fig. 3.

In order to ascertain clinically a subject's sensitivities and behavior characteristics in accordance with the invention, under driving conditions when operating a motor vehicle in a manner normally encountered on a road, the subject to be tested is submitted to artificial conditions simulating actual conditions as closely as desired. To achieve such simulation conveniently, a subject is seated in a piece of apparatus that may be stationary and disposed in a laboratory or testing room and one or more stimuli, simulating driving conditions, given. The apparatus provided is arranged to generate the stimuli desired, which are given in accordance with the procedural steps of the present invention. The apparatus is preferably equipped with the usual equipment of a motor vehicle, and includes a driver's seat and one or more of the conventional motor vehicle controls.

The apparatus of the present invention in order to register reactions is advantageously provided with registering equipment of the character ordinarily used in psychological laboratories for determining such behavior characteristics of a subject as are desired and which are deemed involved in the operation of a motor vehicle on a highway. Accordingly response registering devices, such as stop clocks, are incorporated and arranged to indicate the instants when a subject reacts to an applied stimulus; for example, a timing device may be arranged to register when a subject perceives a certain signal, while another timing device may indicate the instant the subject muscularly responds to the signal, such instruments being provided with recording devices when desired.

The procedural steps for testing a subject in accordance with the method of the present invention involves generally having the subject seat himself or herself in the apparatus and then causing the apparatus to simulate conditions that the subject would actually encounter when operating a motor vehicle on a road. This is conveniently accomplished by having the subject gaze upon a road scene through a part of the apparatus that is made to simulate a windshield; motion being preferably imparted to the road scene in order to cause it the more readily to simulate effects perceived when riding on a highway in a moving vehicle.

The second procedural step involves generally the generation of a stimulus corresponding to a condition desired to be applied to a subject in order to get his reactions and sensitivities when operating a motor vehicle. The apparatus employed is advantageously arranged to generate the stimulus applied. A variety of stimuli is generally desirable, for example, the apparatus may be arranged to give the appearance of a curve on the road, or flash a light, or move an object.

The third procedural step involves registering when the subject sensorially perceives the stimulus to which he has been subjected, while the last procedural step involves the registering of the instant when the subject muscularly reacts and selects and operates a control.

The apparatus provided for such procedures advantageously comprises a cabinet which is preferably arranged to house or support all of the testing instrumentalities here employed. Such cabinet is readily adapted to be installed in a laboratory or testing room, and may consist of a panel equipped to simulate the standard parts of a motor vehicle associated with the driver's seat. The driver's seat in such apparatus is advantageously mounted on a base or other portion of the cabinet, the controls being arranged on the panel to be in conventional positions suitable for manipulation by the subject while seated and being tested. To give the subject the proper stimuli simulating conditions encountered when driving on a road, the cabinet is provided with a transparency comprising a window, representing a windshield, and a cooperating road scene disposed in the cabinet so as to be seen through the windshield by the subject.

The road scene provided has associated devices for making its condition simulate various actual operating conditions on a public highway, such as means for making a red stop-light appear, or for making a green go-light appear, or for making a truck loom onto the road horizon. By such means, suitable stimuli are given to ascertain the subject's behavior when operating a motor vehicle, for example, his speed of muscular response in applying a brake, his vigilance, or his reactions in dimming and deflecting headlights. The road scene also preferably has means for imparting motion thereto, whereby it is made to simulate curves in the road about which the subject must steer, so that the subject's ability to keep his vehicle on a desired part of the road may be ascertained.

The subject's sensitivities or reaction periods to the road conditions simulated are precisely ascertained by associating with each of the stimuli giving means suitable response registering means together with indicating instruments that are actuated by the subject when he responds to the stimuli whereby his reaction periods are obtained. This is advantageously achieved in the present invention by providing time indicating devices which are coordinately associated so as to be actuated when a desired condition is simulated, whereby the instant that the stimulus occurs is registered; for example, an electric stop clock may be connected in a suitable electric network so as to register the instant a red light appears. Another electric stop clock is also preferably connected in the network for registering the instant when the subject responds to such appearance.

Time measuring instruments, such as electric stop clocks of the character indicated, are relatively expensive pieces of apparatus. In order, therefore, to reduce the cost otherwise of the testing apparatus, the network employed is preferably provided with switching means whereby a plurality of different registering circuits may be set up having such instruments in common.

Such switching means is preferably actuated automatically by suitable means when a period, predetermined to be the normal period to be allowed a subject for a test, has elapsed. In this way, the so-called "personal equation" of the one giving the test is eliminated. Any suitable automatic switch operating means may be employed, for example, one or more switches that are operated by cams may be employed, the whole being driven by a motor that runs for the predetermined test period. The predetermined test period has been empirically found to be in the neighborhood of eighty seconds. Hence, a motor which drives the switch moving cams at a rate of substantially three-quarters of a revolution per minute is suitable for automatically changing and controlling the network to make tests in accordance with the invention.

Referring now to the drawings, and particularly to Figs. 1 to 3, 5 denotes a front panel of a cabinet which has a window or transparency 6 with a road scene on a screen 7 disposed behind it. The subject to be tested is seated before the transparency in a driver's seat 8 on a base portion 9 of the cabinet. This base may be employed, if desired, to house one or more parts of the operating mechanism employed in the present apparatus. Adjacent the seat 8 are disposed devices simulating the standard controls of a motor car; the devices shown comprise a headlight controlling button 10, an accelerator pedal 11, a braking pedal 12, a clutch pedal 13, and a steering wheel 14, the latter having a column 15 that extends into the panel base, and has secured on its lower end an actuating sprocket 16. A chain or cable 17 engages with the sprocket 16 and is connected to a horizontally sliding rod 18 that is preferably disposed in the upper part of the cabinet but below the window and carries an element 19, simulating the hood of the car being driven. The hood-element 19 when seen by the subject through the window 6 serves as the means by which he judges his position on the road scene.

Figure 7:
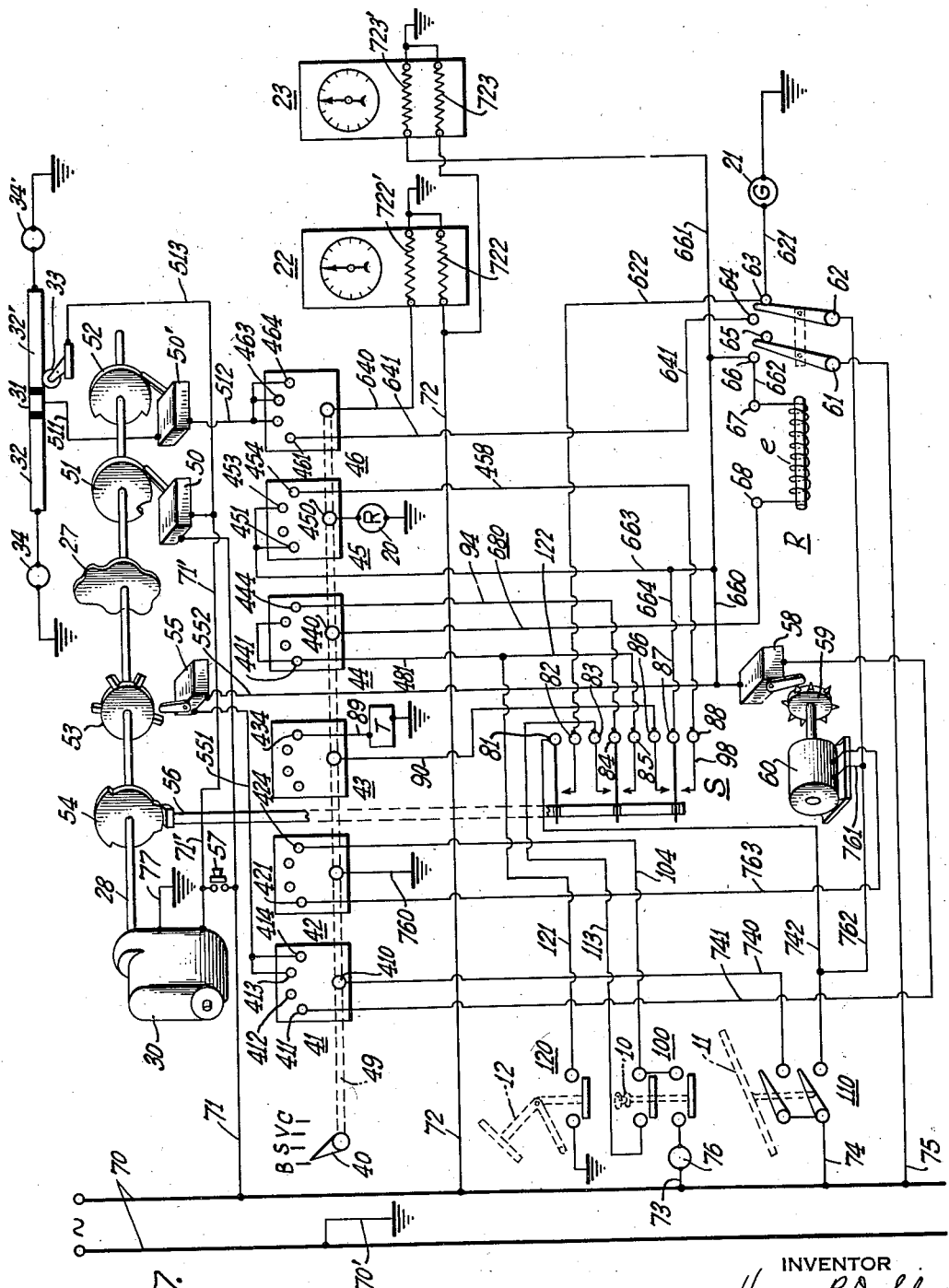
Fig. 7 is a diagrammatic view of an electrical network employed for actuating the apparatus of Figs. 1 to 3.

In order to equip the apparatus with means for giving a braking test, a red signalling light 20 is disposed on screen 7 and arranged to be seen in the road scene and connected in a circuit to be illuminated by electric current, supplied as hereinafter more particularly described. A green signalling light 21 is also preferably disposed in the road scene and connected in another circuit, as hereinafter described. To ascertain the reaction periods of the subject, a pair of electric stop clocks, shown respectively at 22 and 23 in Fig. 7 are provided in or adjacent to the cabinet and connected in circuits arranged to be energized automatically at the time that the accelerator pedal 11 is depressed. The red light 20 is arranged to be flashed at times preferably determined automatically by the switching means employed. When the subject lifts his foot from accelerator pedal 11 the circuit energizing one clock, for example, that at 22 is arranged to be broken so as to stop the clock. When the braking pedal 12 is applied, the circuit energizing the second clock 23 is arranged to be broken so that it, likewise, is stopped. The periods registered show the instants when the subject reacted and raised his foot from the accelerator pedal and placed it on the braking pedal.

In order to equip the apparatus so as to give a steering test, the screen 7 is advantageously arranged to be suspended in the cabinet by a pair of swinging brackets 24, pivoted to supporting rods 24'. Motion, preferably a relatively slow oscillating movement, is communicated thereto by suitable means, such as a connecting rod 25, shown in Fig. 4, that is arranged to be moved by a lever 26 pivoted in the cabinet. Any suitable means for actuating this lever may be employed; for example, an irregular cam 27 on a shaft 28 which engages lever 26, through contact of the cam's periphery with a follower 29 on the lever. The shaft 28 is preferably driven by a relatively slow running motor, such as the geared motor shown at 30, which is coupled to operate the switching means, hereinafter described, and to determine the duration of the predetermined test period. The motor 30 and the cam shaft 28 are mounted in any suitable manner, for example, on a shelf 30' in the cabinet, as shown in Fig. 3.

Suitable response registering means for the present apparatus comprise electric circuits controlled by car control actuated switches coordinated with the various stimuli giving means. Suitable switching means for the steering test comprises a relatively narrow electric contact member 31 on the screen 7 at a point preferably out of the range visible through window 6. At each side of the contact member 31 additional elongated contact strips 32 and 32' are provided on the screen but insulated from the member 31. Cooperating and engaging with these contacts is a roller contact 33 which is secured to and moves with the hood-element 19. By this arrangement it is seen that movement of the hood-element causes the roller contact to roll over and selectively engage with these contacts. When the road scene is oscillated simulating a curve, the steering control must be operated, i. e., the roller contact should be kept on the central contact 31 by manipulating the steering wheel 14. In the event that the subject is not keeping his hood-element in the proper part of the road scene, the roller contact will engage with either the strips 32 or 32'. Electric circuits are arranged to be closed through these strips to illuminate one or the other of the "off-the-road" signal lamps 34 and 34' which are disposed respectively in series therewith and mounted so as to be seen by the subject respectively on the left and on the right sides of the cabinet. When, however, the roller contact 33 is on contact member 31, a third circuit is arranged to be closed, which includes clock 22. Arrangements are made so that as long as hood-element 19 is in the proper part of the road scene, this circuit remains closed and the clock is kept running.

To equip the apparatus to give a vigilance test, provision is made for flashing the red light 20 at irregular intervals and the reaction times ascertained as in the braking test, while at the same time requiring the subject to operate his steering device to keep hood-element 19 on a desired part of the road scene.

To equip the apparatus to give a combined test in which the several previous faculties are called into play and in addition watchfulness for a suddenly appearing object, the apparatus is provided with a movable object 35 which may have the appearance of a truck or other apparition adapted to loom above the horizon 36 in the road scene. To this end, the object 35 is mounted, as shown in Fig. 5, on a lever 37 that is pivoted at 38 to the back of screen 7. An electromagnet 39 is arranged, when energized, to apply power to the lever and move the object 35 to the visible position above the horizon 36. The energization of the electromagnet 39 is accomplished by an electric circuit, hereinafter described, which has a portion in parallel for illuminating an electric lamp 39' that is associated with the object 35 in order to make openings, shown at 35', simulate the appearance of headlights. The circuits are also arranged to start the clocks when this object appears, and a portion is arranged to be connected with the headlight switch 10 for operation by the subject when he sees object 35.

To equip the apparatus for giving selectively any of the above tests, such as testing simultaneously for steering ability and braking reactions and/or reactions to the appearance of an object on the road, a plurality of different circuits are arranged to be set up when desired by means of switching devices manipulated from the front panel by the person giving the tests. Any suitable switching device may be employed, for example, a gang-switch having a plurality of positions and operated by a handle 40, disposed for manipulation on the front panel. The gang-switch comprises a plurality of bases or insulating plaques on which are mounted contact arms ganged together for movement simultaneously over terminals on the several bases; the latter being shown respectively at 41, 42, 43, 44, 45, and 46 (the contact arms not being shown in the interests of clearness of illustration). The movement of the contact arms is accomplished by a common shaft, shown in broken lines at 49, that is connected to the handle 40.

In order that the response registering circuits may be automatically set up when desired, or for but a desired portion of the predetermined testing period, where it is desired to permit some initial practice in steering, one or more control switches are provided which determine the order and instant when the circuits become operative. In the network, here employed, this is accomplished by connecting automatic control switches, such as cam actuated commutator switches, denoted 50 and 50', in series respectively with the motor 30 and the clock 22; the actuating cams are advantageously on the shaft 28. Such cams are shown respectively at 51 and 52 and engage with actuating levers of the switches. Constructional details of such switches are shown in Fig. 6.

The shaft 28 is advantageously provided with another cam 53 which has prongs at irregular intervals for moving the actuating arm of another commutator switch 55, for determining the instants when a red light circuit or a truck circuit shall be closed. Such illumination is preferably controlled by an auxiliary device, such as a relay, shown at R in the network hereinafter described.

A fourth cam 54 is also preferably provided on the shaft 28 which is arranged to move a rod 56 that actuates the movable blade members of a shift switch, generally denoted S, that is arranged to have three positions and is adapted for changing a relatively large number of circuits simultaneously.

A push button switch 57 is mounted on the cabinet for starting the motor 30 at will. Such switch is connected in the motor controlling circuit, in parallel with switch 50. The motor 30, when running, is seen to oscillate the screen 7 through cam 27 and to actuate the circuit controlling cams 51 to 54 simultaneously. The cam 51 is hereinafter referred to as the "stop cam" since it has a notch to throw the actuating lever of switch 50 and hold the circuit closed until the the notch comes around again, which is at the end of the predetermined test period. Cam 52 has a longer notch cut in its circumference, the length of which determines the period allowed for practice before the steering reaction registering circuits are closed. This practice period may be any convenient portion of the predetermined test period, for example, twenty seconds. It is hence referred to hereinafter as the "sixty second cam." The third cam 53 which actuates switch 55 at irregular intervals for illuminating the red light 20, is propelled by the motor 30 and is hereinafter referred to as the "slow cam," while the cam 54 which operates the switch S is referred to as the "shift cam."

For certain tests the flashing of red light signals is desired at a more frequent rate than is had from cam 53. An independent commutator switch 58 is, therefore, provided in parallel with the switch 55 and arranged to have its lever actuated by a cam 59 which is independently driven by a relatively fast running motor shown at 60.

It is here preferable to control not only the red light circuit, but also the circuits through the timing instruments by means of a common device. The relay R, here shown for this purpose and illustrated in Fig. 7, has terminals 61 to 68, connected for such ends. The relay includes an actuating electromagnet e connected across terminals 67 and 68. This electromagnet when energized swings a pair of contact making arms, pivoted respectively to the terminals 61 and 62, away from terminals 63 and 65 into engagement with terminals 64 and 66, these arms being insulated apart in order to control their circuits separately.

The network of Fig. 7 comprises circuits coordinating the registering instrumentalities employed with the stimuli giving devices. This network is preferably arranged to be supplied with regulated alternating current, since clocks are to be run. A pair of A. C.-supply buses are accordingly shown at 70, one of which is selected as the return bus and is indicated as grounded. Any suitable return may, of course, be employed; the frame of the apparatus, if of metal, being suitable for a ground return. A ground return to one bus is shown at 70'. The other bus is tapped by a plurality of device supplying or trunking conductors. The first trunking conductor is shown at 71 and leads to a terminal of the switch 50 which is in series with the motor 30, through conductor 71'. The return for the motor is by way of conductor 77 which is connected to ground. The starting switch 57, connected in parallel with switch 50, is bridged across conductors 71 and 71'.

A second trunking conductor 72 is tapped into the supply bus at 70 and has running windings 722 and 723 of the clocks 22 and 23, connected thereto in parallel, the return for these windings being through ground. By this arrangement, it is seen that the clocks are always supplied with running current but do not register time intervals unless their clutch windings, as hereinafter explained, are simultaneously energized.

A third trunking conductor 73 is tapped into the supply bus and leads to one pole of a switch 100, which is preferably double-poled and has bridging members connected to be actuated simultaneously by the head-light controling button 10. A subject's head-lamp 76 is preferably also connected in series with the conductor 73 and the switch 100.

A fourth trunking conductor 74 is tapped into the supply bus 70 and leads to one pole of an accelerator actuated switch 110, which is also shown as a double-pole switch that is normally open but arranged to have its bridging members closed by pressure from the accelerator pedal 11. As shown, conductor 74 is connected to the two poles on the near side of the switch. From one pole at the other side a conductor 740 leads to the contact arm terminal 410 on plaque 41 of the gang-switch, whose terminal 411 has a conductor 741 that is in series therewith when bridged by the arm and leads to one pole of commutator switch 58. The other pole of switch 110 is connected by conductor 742 with contact 81 of switch S and has in parallel a conductor 762 leading to the terminal 62 of the relay R.

A fifth trunking conductor 75 is tapped into the supply bus at 70, and leads directly to the terminal 61 of the relay R. The terminals 61 and 62 of the relay are seen to be those which supply current to terminals 66 and 64 when the relay closes. When the relay is open or deenergized, it has the arm at 62 in engagement with the terminal 63 for supplying current to a conductor 621 which leads to the green signal lamp 21, the return circuit of which is through ground. From terminal 63 there leads another conductor 622, to a selected terminal of the switch S, which has eight terminals designated 81 to 88 respectively. That to which conductor 622 is connected is designated 82.

Beside the switches 100 and 110, there is another switch 120 mechanically connected to be opened when the brake pedal 12 is depressed; the assembly of the latter preferably including a motion opposing dash-pot, as shown at 12' in Fig. 3. The switch 120 may be single poled and is arranged to open the return of certain circuits set up by the cams. Accordingly, one terminal of switch 120 is shown connected to ground. The other terminal is connected by conductor 481 that leads in parallel respectively to the fifth terminal 85, of switch S, and to terminal 441 on plaque 44. Terminal 441 has a conductor connecting it in parallel with terminal 443, as shown. By operating the gang-switch and the shift switch, a plurality of circuits are set up, certain of which have the switch 120 in series and are adapted to be opened when the brake pedal is depressed.

The terminals 413 and 414 on plaque 41 are connected in parallel by a conductor 551 that leads to one terminal of the commutator switch 55. From this latter a conductor 552 leads to one terminal of commutator switch 58, there being a common connection for these switches connecting them in parallel through conductor 660 to the terminal 66 of relay R. Conductor 662 connects this terminal to terminal 67 so as to have electromagnet e in series. The return circuit for the relay is seen to comprise conductor 680, leading from terminal 68 to contact arm terminal 440, and conductors 481, 121 and switch 120 which is grounded. When the handle 40 is moved to its first position so that the contact arm of plaque 44 engages with terminal 441, it is seen that a circuit is set up which is controlled by the brake pedal switch 120. When the brake pedal is depressed, the switch 120 is opened and current through the electromagnet e is interrupted so that the relay is deenergized.

The fast running motor 60 is arranged to be energized when the accelerator pedal is depressed. To this end, a conductor 761 is connected from the motor to conductor 762 which is in parallel with conductor 742 that leads from a terminal of the switch 110. This switch when closed establishes connection with conductor 74. From the other side of the motor a conductor 763 leads to terminal 421 on plaque 42 whose contact arm completes the return through ground, by way of a conductor 760.

The plaque 43 of the gang-switch has its contact arm connected by conductor 90 to the sixth terminal 86, of shift switch S. A conductor 89 leading from terminal 434 is arranged to supply current to the apparition assembly, which is shown in detail in Fig. 5, but generally at T, in Fig. 7. The return circuit for this assembly is again indicated as through ground.

The plaque 44 of the gang-switch, as already mentioned, has its terminal 441 connected in parallel with terminal 85, of the switch S, and to a terminal of the brake pedal actuated switch 120. Besides the conductor 680 that leads to this plaque, there is a third conductor 94 which leads from terminal 444 to the fourth terminal 84 of the switch S. The terminals of the plaques 45 and 46 have connections energized by the relay R, as shown.

This relay when energized operates, as above indicated, to supply current to the terminals at 66 and 64. From terminal 64 there leads a conductor 641 to terminal 461 on plaque 46 which when bridged by the contact arm is connected in series to the clutch winding 722' of the clock 22, the return being through ground. From this, it is seen that when handle 40 turns the gang-switch to its first position a circuit is set up which, upon movement of the relay arms, energizes the clutch winding 722' of clock 22 and starts the clock hand moving. In like manner, deenergization of the relay stops the clock hand. The other terminals on plaque 46 are connected in parallel through a conductor 512 with a terminal of the switch 50', which is in series with the contact member 31, through conductor 511. Thus, in any one of the other three positions of the handle 40, circuits are set up which operate to energize the clutch winding 722' only when the roller contact 33 is kept on contact member 31 by proper steering. The steering controlled clock circuit is seen to comprise conductor 71, switch 50, conductor 513, the contacts 33, 31, conductor 511, switch 50', conductors 512, 640 and winding 722' which is grounded.

From the terminal 66 lead a plurality of conductors arranged to establish parallel circuits when the relay is closed. One of these circuits comprises the conductor 661 which leads to the clutch winding 723' of the clock 23, the return connection being through ground. A second circuit comprises conductor 662 which is connected across terminals 66 and 67 for supplying energizing current to the electromagnet e for holding the relay closed, independently of switches 55 and 58. A third circuit comprises conductor 663 which leads in parallel to terminals 451 and 453 on plaque 45, the return from which has red light 20 in series and leads to ground. Plaque 45 has another conductor 458 connected to its terminal 454 that leads to terminal 88 of the switch S. Terminal 454 is energized in one position of the switch by current from a fourth conductor 664 that leads from terminal 66 to the seventh terminal 87, of the switch S. From this, it is seen a circuit is set up by switch S that illuminates red light 20 when the relay closes. Conductor 660, already mentioned, may be regarded as in a fifth circuit comprising conductors which are in parallel with the other circuits but supplies actuating current to terminal 66 from a terminal of one or the other of switches 55 and 58.

In Fig. 6 are illustrated details of a commutator switch of the character shown respectively at 50, 50', 55, and 58. Here the cover is shown removed but its position indicated by broken lines at 50h. A cylindrical member 50a has an actuating lever 50b and is rotatively mounted on a base 50g.

The cylinder is mainly of insulating material but carries a peripheral conducting member that is engaged by a contact terminal 50c mounted on the base. The conducting member also has a conducting tongue or segment that is adapted to be engaged in one of its operative positions by another contact terminal 50d on the base. To bias the cylinder in an open circuit position, suitable means are preferably incorporated, for example, a spring, shown at 50f, connected between a lever arm on the cylinder and a post on the base. By this arrangement, the switch which is normally open may have its lever 50b actuated to turn the cylinder to a position which completes the circuit through terminals 50c and 50d.

In operation, when a subject is to be tested for sensitivities and reactions to road conditions in accordance with the invention, the subject is seated before the panel 5 and instructed as to the test to be given. The subject is then given stimuli simulating certain road conditions requiring him to react; for example, giving him a stop signal requiring the depression of the brake pedal to get his braking reactions.

To prepare the subject when seated in the apparatus for the braking test, he is instructed by the person giving the test (hereinafter referred to as the "tester") to place his foot first on the accelerator pedal 11 but when he sees a red light in the road scene, to remove his foot and apply it to the brake pedal 12. To set up the circuits for this test, the tester then turns handle 40 to the first position, i. e., that designated by "B" in Figs. 1 and 7.

When all is ready for the test to begin, the subject places his foot on the pedal 11 and closes the switch 110. The closing of this switch sets up parallel circuits in each of the conductors 740, 742 and 762. Besides these circuits, conductor 761 is also energized by this set-up to start motor 60, the return from which has in series the conductor 763, the gang-switch arm on plaque 42, and conductor 760, that leads to ground. Conductor 740 is bridged by its switch arm to set up the circuit comprising conductor 741, switch 58, conductor 660, terminal 66, electromagnet e, conductor 680, the switch arm at 440, conductor 481, conductor 121, and the switch 120, which is closed and grounded. For this test, the terminal of conductor 742 on switch blade 81 is not energized. Conductor 762 which leads to the relay arm at 62, however, momentarily supplies current to the terminal 63 and thence by conductor 621 to illuminate the green light 21 which the subject sees through window 6. At the same time, the trunking conductor 75 supplies current to the relay arm at 61.

After an interval, determined by the fast cam 59, which is set running when the motor 60 starts, the switch 58 is actuated to close a circuit comprising conductors 74, 740, and 741, switch 58, conductor 660, terminal 66, electromagnet e, conductors 680 and 121, and switch 120, which is grounded. The electromagnet e hence moves the relay arms at 61 and 62 opening the circuit of the green light 21 and energizing new circuits as follows: Considering the arm at 62 which now engages terminal 64, as a source of power, current passes therefrom in the circuit comprising conductors 641, 640 and clutch winding 722' which starts the hand of clock 22 moving. The arm at 61, having been simultaneously closed, establishes a circuit from terminal 66 through conductor 661 and clutch winding 723' which energizes the same and starts the hand of clock 23. Current is also supplied now to electromagnet e from the terminal 66 cutting out the switch 58. A third circuit from terminal 66 supplies current by way of conductor 660 to the contact arm on plaque 45 to illuminate red light 20.

The subject physically exhibits perception of the light at 20, by raising his foot from pedal 11, thereby opening the circuits of switch 110. This stops motor 60 and cuts off the supply of current to terminal 64. Clutch winding 722' is thus deenergized and clock 22 stopped which then shows the interval of time between the appearance of the red light and the instant when the subject reacted to remove his foot from the accelerator pedal.

When the subject gets his foot on the brake pedal 12 and depresses it so as to open the switch 120, then the energizing circuit of the electromagnet e is broken and the relay arm at 61 moves away from terminal 66 and opens the circuit through conductor 661 and clutch winding 723' so that it is deenergized and the second clock stopped. This second clock having been started simultaneously with the first clock 22, but stopped at the instant that the braking pedal was applied shows the subject's reaction period between physical exhibition of perception of the red light signal and his operating response (that is, his action in operating mechanism which under ordinary circumstances would stop car motion in response to the red light signal) by the difference in the readings of the time intervals registered on the clock dials.

During this test, the cam 54, which moves rod 56, is seen to actuate the shift switch S. This switch is seen to have three blades conductively connected to terminals 81, 84, and 87, respectively, these blades being insulatingly connected to the rod 56 so as to be moved by cam 54. On each side of the blades, except the first, are contacts connected to the other terminals so that the switch has three positions, namely, an "up-position," a "down-position," and an intermediate or "neutral position." The cam 54 is advantageously so shaped as to cause each of these positions to occur twice during the cycle of the test period. If now switch S is moved to the down-position, the blade at 81 engages its lower contact that is connected to terminal 82 completing a circuit comprising conductor 74, switch 110, conductor 742, the blade at 81, the terminal 82, conductors 622 and 621, and the lamp 21, which is grounded. The cams 54 and 59 are so shaped and positioned that the lights at 20 and 21 are flashed at the desired time.

To give a test for steering ability and reactions to road form, the tester instructs the subject to keep his car, by a manipulation of steering wheel 14, on the right side of the road which he can determine by the position of hood-element 19 on the road scene. To set up the circuits for this test, the tester moves handle 40 to the second position, i. e., that designated "S" in Figs. 1 and 7. This moves the contact arms of the gang-switch simultaneously from their first terminals to their second terminals, all of which are dead except that on plaque 46 which is connected to switch 59'. The circuit having switches 50, 50', the contacts 31—33 and motor 30 in series, is thus set up.

When the subject is ready to be tested, starting switch 57 is pushed for a moment, when the circuit comprising conductor 71, switch 57, conductor 71', motor 30, and conductor 77 in series is energized, the return being through ground.

Motor 30 now runs turning shaft 28 at the rate of ¾ of a revolution per minute. Cam 27 operates through lever 26 and link 25 to swing the road scene 7 back and forth. Cam 51 is also rotated and actuates switch 50 cutting out switch 57 and taking control of motor 30 which will now be kept running until the shaft 28 completes a revolution, as above explained.

In parallel with motor 30 but in series with switch 50 are the contacts 31—33 and switch 50', the latter being actuated by the sixty second cam 52 after a practice period of twenty seconds has elapsed. During the practice period, should the subject be steering too far to the left, contact 33 engages with strip 32 and warning light 34 is illuminated. If during this period, strip 32' is engaged, then warning light 34' is illuminated. When the practice period is ended, the sixty second cam 52 closes the circuit comprising conductor 71, switch 50, conductor 513, contact 33, member 31 (provided the hood-element 19 is being retained by manipulation of steering wheel 14 in proper position), conductor 511, switch 50', conductor 512, contact arm on plaque 46, conductor 640, and clutch winding 722' which is grounded. The clock hand of clock 22 is seen in consequence to start moving. So long as contact 33 is kept on member 31 the clock 22 is kept running but stops for the period or periods of time that the contact is on either strip 32 or 32'. When sixty seconds have elapsed, cam 51 moves switch 50 to stop motor 30 and the test period is automatically terminated. It is also seen that the clock 22, if it be provided with a dial reading one minute and graduated in hundredth-parts, is an instrument reading directly in percentage the portion of the test period that the subject was able to stay on right side of road.

The steering wheel 14 when manipulated by the subject is seen to rotate the sprocket 16 and moves the cable 17 which in turn draws rod 18 from right to left, or vice versa. This movement of rod 18 moves hood-element 19 and the roller contact 33 that it carries. When the cam 27 oscillates screen 7 so that the road scene simulates a curve in the road, the subject is required to manipulate wheel 14 to keep contact 33 on member 31, since the latter is on screen 7 and moves out from under contact 33 when the road scene is oscillated unless the steering wheel is manipulated to make contact 33 follow member 31. This can only be judged by watching the position of hood-element 19 on the road scene.

To give a vigilance test, the subject is not only tested for steering reactions but he is instructed to be on the watch for signals while driving. The subject accordingly places his foot on the accelerator pedal and watches for red lights as signals to apply the brake pedal while steering. To set up the circuits for such a test, the tester moves handle 40 to the third position, i. e., the one designated "V" in Figs. 1 and 7.

When the subject is ready for the test, he places his foot on pedal 11 closing switch 110 which illuminates green light 21 through the circuit, above described. Motor 60 in this case is not started. Instead, motor 30 is started by the tester who momentarily presses push button switch 57. After a moment, switch 50 takes control and closes the motor circuit about the switch 57, keeping the circuit closed for the duration of the test period.

In the circuits set up for the vigilance test, conductor 740 is energized by the closing of switch 110, this conductor being now connected in series with conductor 551 by the switch arm on plaque 41. Conductor 551 has switch 55 in series with it for closing the circuit by the slow cam 53 which leads through conductors 552 and 660 to terminal 66 and thence through electromagnet e, conductors 680, 481 and 121 to switch 120 and thence to ground. This actuates the relay and causes the arms pivoted at 61 and 62 to swing to closed positions. Only that at 61, however, energizes the clutch winding 723' of clock 23, since the switch arm on plaque 46, in this instance, cuts out the relay control of clock 22. The closing of the relay arm pivoted at 61 is seen now to supply current directly from conductor 75 to the circuit of the red light 20 by way of conductor 663, this circuit being in parallel with that through switch 120.

At such time, while the cam 27 has been rotating, causing the screen 7 to oscillate, the subject has been required to manipulate steering wheel 14 to keep his hood-element 19 in a desired part of the road scene. The clutch winding 722' of clock 22 is seen to be here under the control of switch 50' which is actuated by the sixty second cam 52. Clock 22 will thus read the portion of the test period that the subject keeps his hood element in a desired portion of the road scene.

When the slow cam 53 closes the circuit through switch 55, which occurs at an irregular interval after the sixty second cam 52 takes control of the steering circuits, then the red light circuit is closed, which comprises conductor 75, terminal 66, conductor 663, the switch arm on plaque 45, and the red light 20 which is grounded. Upon the appearance of this light the subject changes his foot from the accelerator pedal 11 to switch 120 and depresses it. This deenergizes the electromagnet, extinguishes the red light, and simultaneously stops the clock hand of clock 23. The instant when the red light appears being known to the tester, he can determine the reaction period from the reading on the clock 23 when the brake pedal was depressed.

To give a combined test to the subject which requires more than braking and steering, for example, additionally watching for the appearance of objects such as trucks to which the subject is to respond muscularly and operate selectively another control, such as the leadlight control, i. e., depress button 10, the handle 40 is moved to the fourth position designated "C" in Figs. 1 and 7. The subject is then instructed to be on the watch for suddenly appearing objects and select the appropriate control.

When the subject is ready for the test, the tester again pushes button 57 which sets motor 30 running. As the fourth position of the gang-switch now has the fourth terminal (424) of plaque 42 in the circuit, it is seen that the subject's head-lamp 76 is illuminated by the circuit comprising conductor 73, lamp 76, switch 100, conductor 104, and the switch arm on plaque 42 which is grounded by conductor 760.

Fast cam 53 soon operates switch 55 to energize the electromagnet e; the circuit operated thereby comprises conductors 74, 740, 551, 552, and 660 which lead to the terminal 66 and electromagnet e. From terminal 68, the circuit continues by way of conductors 680 and 94, which are in series and lead to terminal 84 of switch S.

Assume now that the cam 54 is in that part of the cycle of the test period when it moves the switch S to the "up-position." Then when the blade at 84 engages with its upper contact, the circuit of the electromagnet is continued from terminal 83 of switch S by way of conductor 113 leading to switch 100, which, when closed, connects in series the conductor 104 and the switch arm on plaque 42, the latter being grounded by conductor 760. Opening switch 100 is seen in consequence to deenergize the relay.

The switch S when in its "up-position" simultaneously closes another circuit which operates the apparition assembly, shown in Figs. 4 and 5, as soon as the relay is energized. This circuit comprises conductor 75, the relay arm at 61, terminal 66, conductor 664, the blade at 87 in switch S, terminal 86, conductors 90 and 89 and the parallel devices at 39 and 39' which are grounded. The object 35 is moved in consequence to a position above road horizon 36 and the subject sees glaring lights at 35'. Upon seeing this object, the subject is to move his left foot from rest on the floor and place it on the button 10. When this is depressed, the switch at 100 is opened, extinguishing the light at 76 and deenergizing the relay R. The relay when deenergized cuts off current to the devices 39 and 39', so that the object 35 disappears. The deenergization of the relay also causes the arm at 61 to open the circuit through clutch winding 723' so as to get the reaction time from the reading of the dial of clock 23 which was started by the closing of the relay.

As the motor 30 is also running, it is seen that the subject is all the while required to manipulate the steering wheel 14 to keep the hood-element in a desired part of the road scene. Clock 22, which is again under the control of switches 50 and 50', as before, registers the portion of the test period that the subject is able to keep the hood-element in the desired position on the road scene.

Upon the disappearance of the object 35 the subject should remove his foot from the button 10 and it may be assumed that the cam 54 has moved to a point corresponding to the instant in the test period when switch S is moved to the "down-position." At such instant, the relay is again energized through a circuit including the brake pedal switch; the circuit comprising conductors 74, 740, 551, 552, and 660, terminal 65, and electromagnet e of the relay. From the relay, the circuit is completed by way of conductors 680, 94, the blade at 84, the contact at 85, conductors 481, 121, and the switch 120, which is grounded.

Upon the closing of the relay, parallel circuits are directly energized from terminal 66 which again start clock 23 and simultaneously illuminate red light 20. Upon the appearance of the red light the subject is again to depress the brake pedal, stopping the clock 23. From this, his reaction time under such conditions is ascertained.

The green light 21 is seen to be ordinarily extinguished by the closing of the relay R. This might give the impression to the subject under test that the red light is about to flash on. It is, of course, desired to avoid this. The blade 81, when moved by the down-position of switch S into engagement with the contact at 82, closes a circuit that flashes the green light 21 during the test. The circuit accomplishing this comprises conductors 74, 742, the blade 81, the contact at 82, conductors 622, 621, and the lamp 21 which is grounded.

In the modified form of apparatus shown in Figs. 8 and 9, the apparatus is equipped with a speedometer and a gear shift control, in addition to those shown in Fig. 1. A standard electric gear shift is preferred. To this end, a gear shift lever 140 is disposed on the steering column and arranged to be moved selectively to its several positions, for example, into so-called "neutral," "low," "intermediate" and "high" positions.

In this form of apparatus, the speedometer is shown at 160 on the front panel and is preferably coupled to be actuated by an electric motor 170 conveniently disposed in the cabinet. This motor is readily made to simulate the speed of a car corresponding to a given depression of the accelerator pedal 11 by connecting a variable resistance in series with the motor and arranging its value to be under the control of the accelerator pedal. An arrangement of this character is shown in Fig. 9.

In Fig. 9, the motor 170 has a shaft or cable connecting it to the speedometer 160 and has power supplied by a conductor 171 tapped, at a suitable point, into a trunking conductor, as hereinafter explained, the return from the motor being by way of conductor 172 and a variable resistance 173, which is grounded. This resistance is here depicted as a rheostat whose arm is mechanically connected to the accelerator pedal 11 so as to have all of its resistance in series for the up-position of pedal 11, but may be changed to have the same progressively cut out, as the pedal is depressed. Conductor 171 is also arranged to have a switch 130, under control of the clutch pedal 13, in series therewith.

Besides the resistance 173 that is connected in series with motor 170, there are two other elements of resistance in series, namely, those at 272 and 273, which are under the control of the gear shift lever 140. These elements are connected in series between the trunking conductor and the conductor 171 and have their terminals connected respectively to terminals 141, 142, and 143 that are contacted by blade 140' of the gear shift lever 140.

With such apparatus, the subject may be tested additionally for gear shifting ability and is instructed to keep his motor running to show a suitable speed, for example, a speed of from 35 to 40 miles an hour, and not to let the motor stall when shifting gears, such as would occur in actual operation of a motor vehicle in the event that the clutch pedal 13 is not depressed when shifting gears.

The network for coordinating such instrumentalities here consists of circuits added to the apparatus already described and comprises conductors arranged to set up circuits which are extensions of, or supplementary to, those shown in Fig. 7. A network of this character is indicated in Fig. 10.

Figure 10:
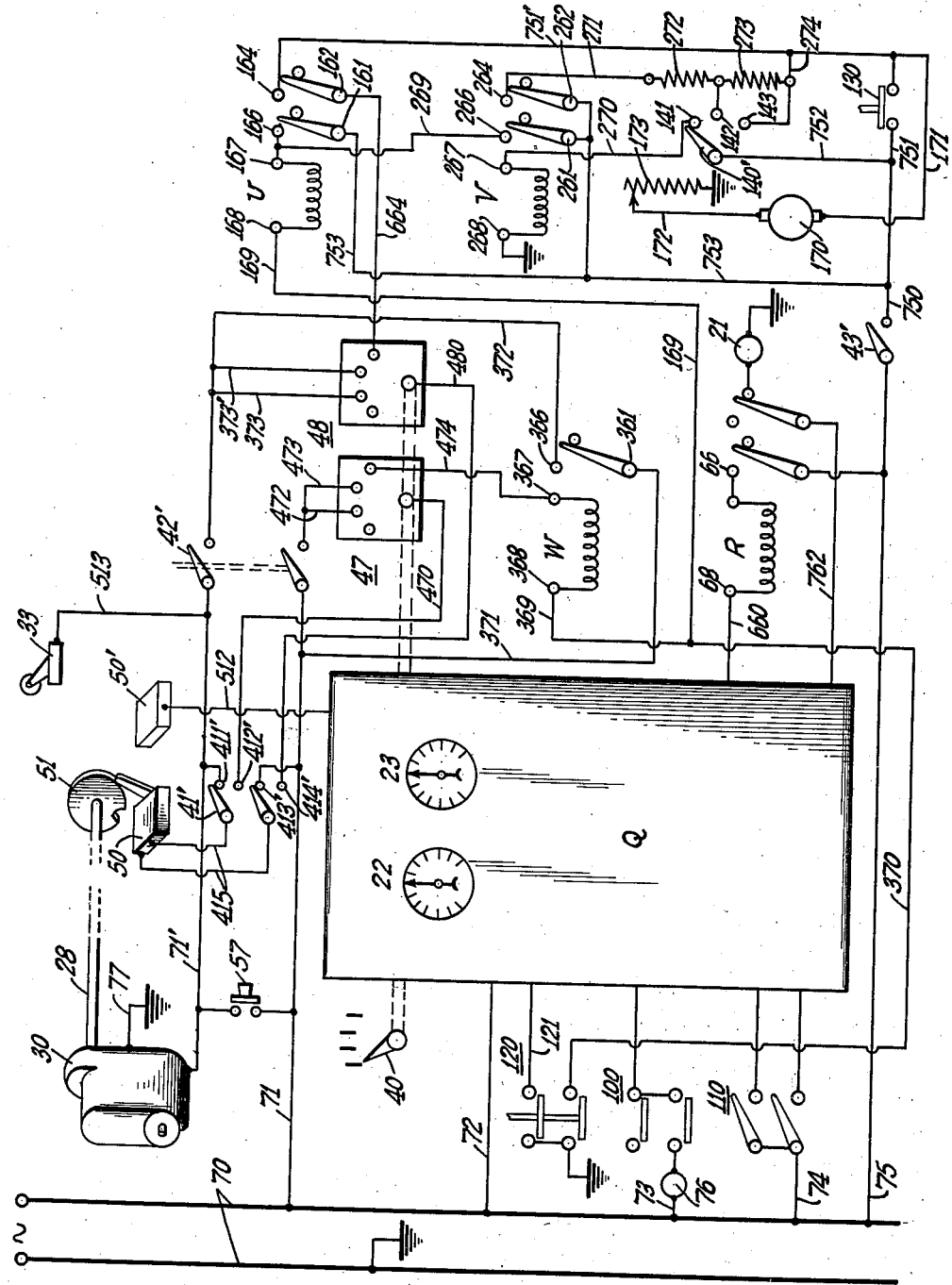
Fig. 10 is a diagrammatic view of a modified form of electric network employed in the apparatus of Fig. 8.

In Fig. 10, the supply buses are again designated 70. The several trunking conductors 72, 73, and 74 lead to the same instrumentalities as shown in Fig. 7, and are here symbolically indicated generally by a rectangle designated "Q." Conductor 71, however, has a disconnecting switch 41' connected in series and arranged to substitute another control for that of motor 30 which is effected by switch 50, in Fig. 7. The relay R is shown outside rectangle Q but in association with it. The stop clocks here employed are shown on the rectangle at 22 and 23. The disconnecting switch 41' is preferably a double-pole double-throw switch having another side in series with conductor 71', in order that in one position the switch 50 may be connected to function as shown in Fig. 7, while in the other position, the switch 50 is cut into the added circuits. A second double-pole disconnecting switch 42' is incorporated to connect conductors 71 and 71' to extension circuits, when switch 41' has been thrown to effect the substitute control. Also, in this form, the trunking conductor 75 is arranged to lead not only to the arm at 62 of the relay R, but, in addition, to a third disconnecting switch 43' which when closed connects other extension circuits. In their up-positions, switches 41', 42', and 43' are arranged to leave the apparatus set up with the circuits of Fig. 7, but in their down-positions to set up the additional circuits provided.

When switch 43' is closed, circuits for coordinating the steering mechanism, the gear shift assembly and the speedometer are set up. To this end, the trunking conductor 75 is then in series with extension conductor 750, which has three branches 751, 752, and 753 arranged in parallel. Conductor 751 leads to a pole of the clutch pedal actuated switch 130 that is normally open, the circuit being continued from the other side of switch 130 as the conductor 751'. Conductor 752 leads to the switch blade 140' which engages successively with terminals 141, 142, and 143; these terminals correspond respectively to the "low," "intermediate," and "high" positions of the gear shift lever. Conductor 753 leads to certain contact arms of two additional relays, denoted U and V, as explained below.

The relays U and V, while they may have any suitable form, are advantageously of the same form as the relay R, and are so shown. Here, conductor 753 is connected to the arm pivoted at 161 in the relay U, and has branches leading in parallel to the arms pivoted at 261 and 262 of the relay V. The return circuit for the relay U is connected by a conductor 169 that is in series with another conductor 370 leading to ground through the brake pedal controlled switch 120 shown in this form as double-poled. The relay V, however, has its return terminal 268 connected directly to ground, as shown.

The relay V is connected to be energized by the gear shift lever 140, when in "low position." To this end, a conductor 270 is connected between the terminals 141 and 267. Another conductor 271 leading from terminal 264 has the resistance elements 272 and 273 connected in series, a by-pass conductor 274 leading therefrom by way of the terminal connected to 143 directly to the conductor 751' for supply power thereto when switch 130 is open. Conductor 751' is connected to supply current to the steering circuit when the relay U closes. Accordingly, conductor 751' is connected to terminal 164 of relay U to be bridged by the relay arm at 162 and connect conductor 664 in series, the latter leading to one terminal of an additional plaque of the gang-switch, provided as hereinafter explained.

In the present arrangement, it is seen that both conductor 171 and conductor 751' lead in parallel from the pole of switch 130 which is remote from conductor 750. When switch 130 is closed by depressing the clutch pedal, current is supplied directly to the speedometer driving motor 170, the return being by way of a conductor 172 to the movable tap of variable resistance 173 whose end is grounded. The movable contact, being mechanically connected to the accelerator pedal 11, cuts out resistance as the pedal is depressed. When switch 130 is open, the elements 272 and 273 are also in series therewith provided the relay V has been closed by the engagement of switch blade 140' with terminal 141. When blade 140' is moved successively to terminals 142 and 143; it is seen that first but one of these elements remains in series, then none. Hence, as the accelerator pedal is now depressed, more resistance is progressively cut out so that the motor 170 is speeded up simulating the performance of a car in which the gears are shifted into "high."

Relay V has its terminal 266 connected by a conductor 269 to terminal 166 of relay U for energizing the latter as soon as the relay V closes. When relay U closes it is seen to supply current directly from the arm pivoted at 161 to the terminal 166 so as to lock itself in closed position, when once closed, and to remain closed until its return circuit is opened by the brake pedal switch 120. Relay U is hence conveniently designated the "locking" relay, while relay V may be styled a "low" relay since it is actuated only when the lever 140 is in "low" position.

In this form, the gang-switch for the network preferably includes two additional plaques, shown respectively at 47 and 48. These plaques are advantageously the same as those previously shown and have contact arms simultaneously moved by the shaft 49. The conductor 664 leads to the fourth position terminal of plaque 48. In the second and third positions of the contact arm, the terminals have conductors 373 and 373' that lead in parallel to connect with a conductor 372 which is connected by switch 42' in series to conductor 71'; conductor 372 being arranged at its other end to connect with the current supplying terminal 366 of another relay, shown at W. This latter may be similar to the relay at R but here employs but one contact closing arm, namely, that pivoted at 361. This latter is connected to receive current by way of a conductor 371 that is connected to the trunking conductor 71.

The double-throw double-pole switch 41' has four terminals, denoted 411' to 414' respectively. Terminal 411' is connected to conductor 71' while that at 413' is connected to condutcor 71. In the up-position, these two terminals are bridged by the switch members to connect the same by way of conductors 415 to the switch 50. Terminal 412', on the other hand, is connected by conductor 470 to the contact arm terminal of plaque 47 while terminal 414' is connected by conductor 480 to the contact arm terminal of plaque 48. In the down-position of switch 41' the terminals of switch 50 are disconnected from conductors 71 and 71' and transferred to the contact arm terminals on plaques 47 and 48.

Plaque 47 has its fourth position terminal connected by conductor 474 to the energizing terminal 367 of relay W, whose return circuit is by way of conductors 369 and 370 to one side of the brake pedal actuated switch 120 which is grounded. The second and third position terminals have conductors 472 and 473 which lead in parallel to one pole at the other side of switch 42' which when closed connects the same in series with conductor 71; this connection being effected at the same time that the conductors 372, 373, and 373' are connected to the conductor 71', as above explained.

By means of the circuits set up by the fourth position of the gang-switch, it is seen that the control of motor 30 by switch 50 is transferred to relay W, this relay having its arm arranged to close the motor circuit in parallel with starting switch 57. Since relay W has the return for its electromagnet grounded through switch 120, it is seen that depressing the brake pedal also deenergizes relay W so that the circuit of motor 30 is opened and the motor stopped. Since the motion in screen 7 is also thus stopped, this simulates stopping a car by applying the brakes.

In operation, the modified form apparatus shown in Fig. 8 is seen to provide means for tests involving manipulation of the gear shift lever control and of the accelerator control, which controls are put into operation simultaneously with the other controls by moving switches 41', 42', and 43' to their down-positions.

When the additional circuits of Fig. 10 are provided, no change in operation is made in the circuits set up for the first position of the gang-switch (that marked "B"). In the second and third positions (those marked "S" and "V"), still no change in operation is made; switch 50 being seen to be still in parallel with switch 57 and controls the motor circuit. In the fourth position, the control of motor 30 is taken over by the relay W, the energization of which is under the control of the shift lever assembly.

To start the combined test employing the additional circuits, the tester momentarily closes the starting switch 57 which starts the motor 30 and causes cam 51 to close switch 50. Switch 50 closes a circuit at one point which has the electromagnet of relay W and a contact arm of relay U in series. Relay W thus closes the motor circuit, comprising conductors 71, 371, terminal 366, conductors 372 and 71', motor 30 and ground, only when both switch 50 and relay U are closed. To cause the latter to close, the subject moves shift lever 140 to the low-position, in which blade 140' contacts with terminal 141. A circuit is then established through the switch blade comprising conductors 75, 750, 751, 752, terminal 141, conductor 270, the electromagnet of the relay V, and ground. When relay V closes, another circuit is established which comprises conductors 75, 750, and 753, the relay arm at 262, conductor 271, the series resistance elements 272 and 273, conductor 274, a portion of 751' and conductor 171 that leads to the motor 170, the return being by way of resistance 173, and ground. This second circuit is seen to set the speedometer motor 170 running but at a slow rate because there are three elements of resistance in series therewith, namely, that at 272, 273, and 173. As the accelerator pedal 11 is depressed, it is seen that the latter element is progressively cut out so that the speedometer motor increases its speed. There is, however, an upper speed limit for this position of lever 140 by reason of the resistances 271 and 272. This limit is preferably such that the speedometer reads but 20 miles an hour.

The closing of the relay V is seen to supply current for energizing the relay U by a third circuit comprising conductors 75, 750, 753, the relay arm at 261, conductor 269, the electromagnet of relay U, conductors 169 and 370, and ground by way of switch 120.

As soon as the relay U closes, it sets up two circuits, one of which locks it closed, the other supplying current to energize the relay W. The first of these is closed by the arm pivoted at 161 and comprises conductors 75, 750, 753, the relay arm, the electromagnet of relay U, conductors 169 and 370 and ground. The other is under the control of the shift lever assembly and comprises conductors 75, 750, 751, the switch 130 when closed, conductor 751', the relay arm at 162, conductor 664, the switch arm at 48, conductors 480 and 470 (switch 50 being closed), the switch arm at 47, conductor 474, electromagnet of relay W, conductors 369 and 370, and ground. When relay W closes, it not only energizes conductor 71' but also 513 leading to the roller contact 33 of the steering circuit. The road scene on the screen 7 is now seen to be in motion, simulating motion on the highway. When the foot is removed from clutch pedal, switch 130 opens, substituting a by-pass circuit about it provided relay V has closed; the circuit comprising conductor 753, terminal 264, conductor 271, elements 272 and 273 and conductor 274.

The subject may now shift his lever 140 successively to "intermediate" and "high" positions. Merely moving the lever 140 into such positions is seen to open the circuit during the time the switch blade at 140 is in the space between terminals 141 and 142. This is seen to open relay V and to interrupt the current supply to conductor 751' and hence to motor 170 and to relay W, causing it to open and break the circuit to the motor 30 and the steering circuit. This simulates stalling of the motor of a car in actual operation. To avoid this, the subject must depress clutch pedal 13 to close switch 130 simultaneously with the movement of blade 140' from terminal 141 to terminal 142. Such depression of the clutch pedal short circuits the resistance elements 272 and 273 during the period of movement of the switch blade. This insures continuity of current supply in parallel through conductors 751' and 171. As a result, the motors at 30 and 170 are kept running. The relay V, however, opens permanently as soon as lever 140 moves its switch blade off the terminal 141.

When shifting from intermediate to high, the subject must again depress the clutch pedal to avoid stopping the motors 30 and 170, and to continue the supply of power to conductor 751' directly from conductor 751. An application of the braking pedal opens switch 120, which is in series with the conductors 169, 369, and 370, and deenergizes the relays R, U, and W, with the result that the circuit of motor 30 is opened and the clocks stopped so as to obtain time readings in connection with the stimuli given.

From the several tests that may be given, whether with the apparatus of Fig. 1, or that of Fig. 8, it is seen that data are obtained, without the hazard of actual operation on a highway, by which a subject's fitness to operate a motor vehicle may be judged by the standards that may be adopted or deemed desirable to apply.

Muscular response may be defined as physical reactions aroused by effective external or overt stimuli.

Behavior may be defined as comportment or the mode of conducting one's self. Characteristics are distinguishing traits. One's behavior characteristics may thus be defined as his comportment distinguishing traits or his characteristic physical action.

For example, a subject having been instructed to remove his foot off from the accelerator pedal when he sees a red light flash on indicates a behavior characteristic by the average time it takes him to remove his foot from the accelerator pedal. This is determined by the registering means which indicates when the red light was flashed on and how long thereafter the accelerator pedal was released. By a number of trials it can readily be determined whether that particular behavior characteristic of the subject is a fast, slow or medium reaction. Thereafter depression of the brake pedal by the subject will give another registered time interval between reaction to the flashing of the red light (that is, physical exhibition of perception by releasing the accelerator, which may be termed a sensorial response to the stimulus) and muscular response of the subject to the stimulus (the flashing on of the red light) in selectively operating controls of a motor vehicle (depression of the brake pedal). A number of such trials will readily indicate whether that muscular response of the subject is ordinarily fast, slow or average.

While the modified form shown has the additional circuits disconnectably connected to the network of Fig. 7, the inclusion of this feature is by no means essential to the apparatus provided, it being contemplated that the circuits of Fig. 10 shall, when desired, be permanently connected to the main network. Also, it will be seen that the apparatus here provided is adapted for instruction purposes as well as clinical purposes, and such use of the invention is contemplated.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. In apparatus for ascertaining a subject's behavior when operating a motor vehicle, the combination comprising a cabinet having a transparency and a plurality of motor vehicle controls, means including a road scene visible through said transparency for simulating driving conditions on a road, means for imparting limited lateral motion to said road scene whereby curves in the road about which the vehicle must be steered are simulated, a plurality of means associated with said road scene including mechanism selectively operable upon manipulation by a tester for giving respectively at the choice of a tester different stimuli that may be encountered on a road by an operator of a motor vehicle, means including mechanism to be selectively operated by the subject being tested at his will upon perception of said different stimuli for selectively registering different behavior characteristics of the subject being tested when subjected to said different stimuli, means for selectively registering the muscular response of the subject to said stimuli in selectively operating controls of a motor vehicle following perception of said stimuli and physical exhibition of perception response thereto by said subject, and means for selectively setting up a coordinated relation between a stimulus giving means chosen by the tester and a predetermined registering means to be actuated by a subject being tested whereby the subject's particular response to the stimulus given is registered and coordinated data as to his behavior are obtained.

2. In apparatus for ascertaining a subject's behavior when operating a motor vehicle, the combination comprising a cabinet having a transparency and a plurality of motor vehicle controls, means including a road scene visible through said transparency for simulating driving conditions on a road, means for imparting limited lateral motion to said road scene whereby curves about which the vehicle must be steered are simulated, a plurality of means associated with said road scene for giving respectively different stimuli that may be encountered on a road by an operator of a motor vehicle, a plurality of electric circuits each inclusive of an instrument actuated thereby for registering when the subject being tested physically exhibits perceptive response to the stimuli, a plurality of electric circuits each inclusive of an instrument actuated thereby for registering when the subject muscularly reacts to stimuli by operating a control, and means for setting up a coordinated relation between a stimulus actuating circuit selected by the tester and a predetermined register actuating circuit which is to be operated by a subject being tested.

3. In apparatus for ascertaining a subject's behavior when operating a motor vehicle, the combination comprising a cabinet having a transparency and a plurality of motor vehicle controls including a brake actuator, means including a road scene visible through said transparency for simulating driving conditions on a road, means for imparting limited lateral motion to said road scene whereby curves about which the vehicle must be steered are simulated, means for signalling when the brake should be applied, an electric circuit including an instrument actuated thereby for registering when the subject physically reacts to show perception of said signalling means, and another electric circuit including an instrument actuated thereby for registering when the subject muscularly reacts to said signalling means by applying the brake and provided with a circuit closing switch operated by the control involving said brake actuator.

4. In apparatus for ascertaining a subject's behavior when operating a motor vehicle, the combination comprising a cabinet having a transparency and a plurality of motor vehicle controls including a brake actuator, means including a road scene visible through said transparency for simulating driving conditions on a road, means for imparting limited lateral motion to said road scene whereby curves about which the vehicle must be steered are simulated, a red light giving signal associated with said road scene, an electric circuit including a clock for registering when the subject being tested shows by physical reaction that he perceives said red light signal, and a second electric circuit including a clock actuated thereby for registering when the subject muscularly reacts by operating proper controls and provided with a circuit closing switch operated by the control involving said brake actuator.

5. In apparatus for ascertaining a subject's behavior when operating a motor vehicle, the combination comprising a cabinet having a window and a motor vehicle steering device, means including a road scene visible through said transparency for simulating driving conditions on a road, means for moving laterally at a relatively slow rate said road scene and giving a stimulus representing a curve in a road about which the operator of a motor vehicle must steer, an electric circuit including an instrument actuated thereby for registering the portion of a predetermined test period that the subject simulates properly steering the car so as to remain in a predetermined part of said road scene, and signalling means for indicating to the subject being tested when not on said predetermined portion of said road scene.

6. In apparatus for ascertaining a subject's behavior when operating a motor vehicle, the combination comprising a cabinet having a transparency and a motor vehicle steering device, means including a road scene visible through said window for simulating driving conditions on a road, means for moving said road scene to a limited extent laterally at a relatively slow rate whereby curves in the road are simulated about which the subject must steer a motor vehicle, an electric circuit including an instrument actuated thereby for registering the portion of a test period that the subject simulates properly steering the car onto a predetermined portion of said road scene, and an electric circuit including signalling means for indicating when the subject steering the car has gotten off a predetermined portion of said road scene.

7. In apparatus for ascertaining a subject's behavior when operating a motor vehicle, the combination comprising a cabinet having a transparency and a plurality of motor vehicle controls including a headlight control, means including a road scene visible through said transparency for simulating driving conditions on a road, means for moving said road scene to a limited extent laterally at a relatively slow rate, means for moving an object into a visible position on the road scene, an electric circuit including an instrument actuated thereby for registering when the subject being tested shows by operating said headlight control that he perceives the object appearing, and an electric circuit including a switch actuated by said headlight control and means for registering when the subject being tested so responds to the appearance of said object.

8. In apparatus for ascertaining a subject's behavior when operating a motor vehicle, the combination comprising a cabinet having a transparency and a plurality of motor vehicle controls including an accelerator, a brake actuator, and a steering device, means including a road scene disposed in said cabinet to be visible through said transparency for simulating driving conditions on a road, means for moving said road scene in general lateral directions at a relatively slow rate for a predetermined test period whereby the road is made to take on the appearance of curves about which a motor vehicle must be steered during said test period, means for giving a red light signal, means including a stop clock for registering when the subject removes the foot from the accelerator pedal, means including a second stop clock for registering when the subject applied the foot to said brake actuator, means for showing the integrated portion of the test period that the subject is able to steer a motor vehicle on a desired portion of said road scene, and means for selectively coordinating the red light signal with the actuation of said stop clocks and the steering with said integrating means.

9. In apparatus for ascertaining a subject's behavior when operating a motor vehicle, the combination comprising a cabinet having a transparency and motor vehicle controls including an accelerator, a brake actuator, a headlight control, and a steering device, means including a road scene disposed in said cabinet so as to be visible through said transparency and arranged to simulate driving conditions on a road, an electric motor having mechanical connections for moving said road scene laterally to a limited extent for a predetermined test period, red and green signal giving lamps associated with said road scene and having electric circuits adapted to illuminate the same, an electric circuit having a stop clock connected to be actuated by the accelerator for registering when the subject being tested shows by movement of the accelerator that he perceives the red light signal, an electric circuit including a stop clock connected to be actuated by the brake actuator for registering when the subject muscularly responds to a red light signal by operating the brake actuator, a third electric circuit arranged to have an instrument showing the integrated period that the subject is able to steer the motor vehicle about the curve simulated, means for concurrently setting said motor into operation with the setting up of said registering circuits, and means for coordinating the stop clock circuits with the light circuits and the integrating circuits with the motor running circuit.

10. In apparatus for ascertaining a subject's behavior when operating a motor vehicle, the combination comprising a cabinet having a transparency and a plurality of motor vehicle controls including an accelerator, a clutch operator, a gear shifting device, and a steering device, means including a road scene disposed in said cabinet to be visible through said transparency for simulating driving conditions on a road, means for moving said road scene in lateral directions at a relatively slow rate for a predetermined test period whereby the road is made to take on the appearance of curves about which a motor vehicle must be steered during said test period, a speedometer disposed in said cabinet so as to be seen by the subject while under test, a motor for driving said speedometer, means under the control of said accelerator for speeding up said motor, and means under the control of said gear shifting device operating jointly with said last-named means for controlling the speed of said motor.

11. In apparatus for ascertaining a subject's behavior when operating a motor vehicle, the combination comprising a cabinet having a transparency and a plurality of motor vehicle controls including an accelerator, a brake actuator, a clutch operator, a gear shifting device, and a steering device, means including a road scene disposed in said cabinet to be visible through said transparency for simulating driving conditions on a road, means for moving said road scene in lateral directions at a relatively slow rate for a predetermined test period whereby the road is made to take on the appearance of curves about which a motor vehicle must be steered during said test period, means for giving a red light signal, means including a stop clock for registering when the subject removes the foot from the accelerator pedal, means including a second stop clock for registering when the subject applied the foot to said brake actuator, means for showing the integrated portion of the test period that the subject is able to steer a motor vehicle on a desired portion of said road scene, a speedometer disposed in said cabinet so as to be seen by the subject while under test, a motor for driving said speedometer, means under the control of said accelerator for speeding up said motor, and means under the control of said gear shifting device operating jointly with said last-named means for controlling the speed of said motor.

12. In apparatus for ascertaining a subject's behavior when operating a motor vehicle, the combination comprising a cabinet having a transparency and a plurality of motor vehicle controls including an accelerator, a brake actuator, a clutch operator, a gear shifting device, and a steering device, means including a road scene disposed in said cabinet to be visible through said transparency for simulating driving conditions on a road, means for moving said road scene in lateral directions at a relatively slow rate for a predetermined test period whereby the road is made to take on the appearance of curves about which a motor vehicle must be steered during said test period, means for giving a red light signal, means including a stop clock for registering when the subject removes the foot from the accelerator pedal, means including a second stop clock for registering when the subject applied the foot to said brake actuator, means for showing the integrated portion of the test period that the subject is able to steer a motor vehicle on a desired portion of said road scene, a speedometer disposed in said cabinet so as to be seen by the subject while under test, a motor for driving said speedometer, means under the control of said accelerator for speeding up said motor, means under the control of said gear shifting device operating jointly with said last-named means for controlling the speed of said motor, and means for selectively coordinating the red light signal with the actuation of said stop clocks and the steering with said integrating means.

13. In apparatus for ascertaining a subject's behavior when operating a motor vehicle, the combination comprising a cabinet having a transparency and motor vehicle controls including an accelerator, a headlight control, a brake actuator, a clutch operator, a gear shifting device, and a steering device, means including a road scene disposed in said cabinet so as to be visible through said transparency and arranged to simulate driving conditions on a road, an electric motor having mechanical connections for moving said road scene for a predetermined test period, red and green signal giving lamps associated with said road scene and having electric circuits adapted to illuminate the same, an electric circuit having a stop clock connected to be actuated by the accelerator for registering when the subject being tested shows by movement of the accelerator that he perceives the red light signal, an electric circuit including a stop clock connected to be actuated by the brake actuator for registering when the subject muscularly responds to a red light signal by operating the brake actuator, a third electric circuit arranged to have an instrument showing the integrated period that the subject simulates properly steering the motor vehicle about the curve simulated, means for concurrently setting said motor into operation with the setting up of said registering circuits, a speedometer disposed to be visible to the subject while under test, an electric motor coupled for driving said speedometer, a controlling variable resistance in series with said motor arranged to have its value decreased by said accelerator, additional resistances under the control of said gear shifting device arranged to have their full values in series when starting the motor and to have portions successively cut out when the gear shifting device is moved to its successive positions, and means for coordinating the stop clock circuits with the light circuits and the integrating circuits with the motor running circuit.

14. In apparatus for ascertaining a subject's behavior when operating a motor vehicle, the combination comprising a cabinet having a transparency and a plurality of motor vehicle controls, means including a road scene disposed in said cabinet to be visible through said transparency for simulating driving conditions on a road, mechanical connections including a cam for oscillating said road scene, a stimulus giving device having a circuit for electrically actuating the same, a reaction registering instrument having a motor vehicle control actuated operating circuit, switching means for setting up coordination between the circuits of said stimulus giving device and said registering instrument, additional cams for operating said switching means, a cam shaft coordinating the operation of all of said cams, and an electric motor for operating said shaft arranged to be initially under the control of one other than the subject.

15. In apparatus for ascertaining a subject's behavior when operating a motor vehicle, the combination comprising a cabinet having a transparency and a plurality of motor vehicle controls, means including a road scene disposed in said cabinet to be visible through said transparency for simulating driving conditions on a road, mechanical connections including a cam for oscillating said road scene to a limited extent laterally, a plurality of electrically actuated stimulus giving devices having circuits for electrically actuating the same, a plurality of reaction registering instruments having motor vehicle control actuated operating circuits, switching means for setting up coordination selectively between the circuits of said stimulus giving devices and said registering instruments, additional cams for operating said switching means, an electric motor coupled to operate all of said cams having an operating circuit, means in said circuit for starting said motor at will, and an additional means for controlling said motor arranged for automatically stopping said motor when a predetermined test period has transpired.

HARRY R. DE SILVA.

CERTIFICATE OF CORRECTION.

Patent No. 2,273,091.  February 17, 1942.

HARRY R. DE SILVA.

It is hereby certified that error appears in the printed specification of the above numbered patent requiring correction as follows: Page 4, second column, line 62, for "controling" read --controlling--; page 6, first column, line 8, for "sutiable" read --suitable--; page 11, second column, line 63-64, claim 5, and page 12, first column, line 5-6, claim 6, for "transparency" read --window--; and that the said Letters Patent should be read with this correction therein that the same may conform to the record of the case in the Patent Office.

Signed and sealed this 14th day of April, A. D. 1942.

(Seal)

Henry Van Arsdale,
Acting Commissioner of Patents.